(12) United States Patent
Frietsch

(10) Patent No.: US 7,277,936 B2
(45) Date of Patent: Oct. 2, 2007

(54) SYSTEM USING NETWORK TOPOLOGY TO PERFORM FAULT DIAGNOSIS TO LOCATE FAULT BETWEEN MONITORING AND MONITORED DEVICES BASED ON REPLY FROM DEVICE AT SWITCHING LAYER

(75) Inventor: Thomas Frietsch, Sindelfingen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 857 days.

(21) Appl. No.: 10/376,305

(22) Filed: Mar. 3, 2003

(65) Prior Publication Data

US 2004/0199627 A1    Oct. 7, 2004

(51) Int. Cl.
*G06F 15/173* (2006.01)

(52) U.S. Cl. .................. 709/223; 709/224; 714/4

(58) Field of Classification Search ............ 709/223, 709/224, 238, 239; 370/466, 392, 252; 714/4
See application file for complete search history.

(56) References Cited

U.S. PATENT DOCUMENTS

| | | | |
|---|---|---|---|
| 6,754,181 B1 * | 6/2004 | Elliott et al. ............... | 370/252 |
| 6,813,634 B1 * | 11/2004 | Ahmed ....................... | 709/224 |
| 2002/0051464 A1 * | 5/2002 | Sin et al. .................... | 370/466 |
| 2002/0138638 A1 | 9/2002 | Hermann et al. | |
| 2002/0161917 A1 * | 10/2002 | Shapiro et al. ............. | 709/238 |
| 2002/0169870 A1 | 11/2002 | Vosseler et al. | |
| 2002/0194319 A1 * | 12/2002 | Ritche ........................ | 709/223 |
| 2003/0009554 A1 * | 1/2003 | Burch et al. ................ | 709/224 |
| 2003/0033404 A1 * | 2/2003 | Richardson ................. | 709/224 |
| 2003/0061339 A1 * | 3/2003 | Benfield et al. ............ | 709/224 |
| 2003/0086425 A1 * | 5/2003 | Bearden et al. ............ | 370/392 |

FOREIGN PATENT DOCUMENTS

EP    1 118 952 A2    7/2001

OTHER PUBLICATIONS

"PING(8)", Berkeley Distribution, Mar. 1, 1997, pp. 1-5.*
"TRACEROUTE(8)", Berkeley Distribution, Apr. 22, 1997, pp. 1-5.*
Stevens, W. Richard., TCP/IP Illustrated, vol. 1, The Protocols, Addison-Wesley 1994 (Reading, MA).
Tanenbaum, Andrew S., Computer Networks (Fourth Edition), Pearson Education, Inc., 2003 (Upper Saddle River, NJ).
Sedgewick, R., Algorithms (Second Edition), Addison-Wesley 1988 (Reading, MA).

\* cited by examiner

*Primary Examiner*—Le Hien Luu

(57) ABSTRACT

A computer-implemented method of carrying out fault diagnosis of a monitored device in an IT network. The IT network has a monitoring station arranged for monitoring the monitored device. A routing path between the monitoring station and the monitored device is traced and stored. In response to an apparent fault of the monitored device at least one request to a device or devices along the stored routing path is sent. The fault is located to within a subnetwork of the IT network based on whether or what sort of a reply to the request is received from the requested device or devices.

29 Claims, 9 Drawing Sheets

FIG.3
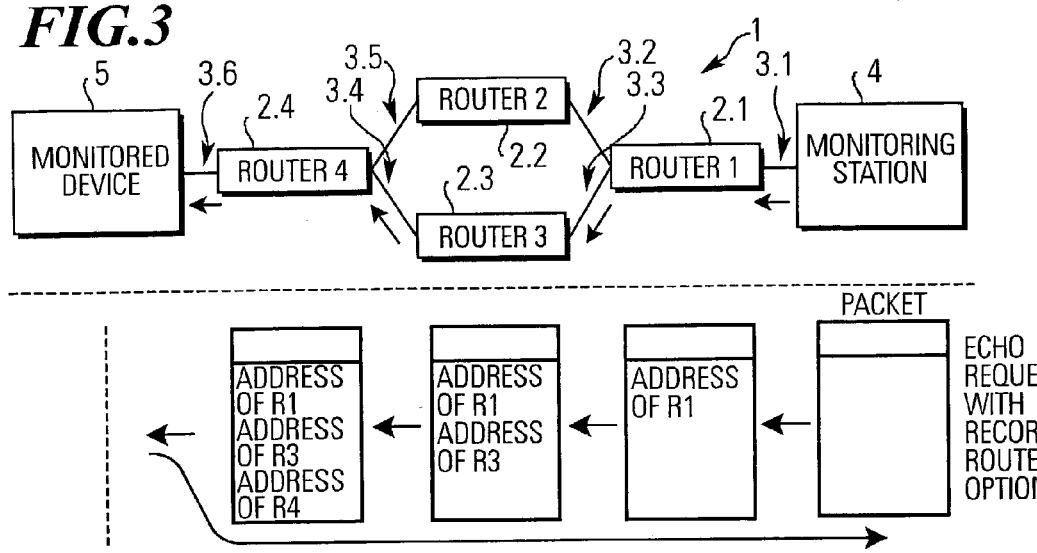
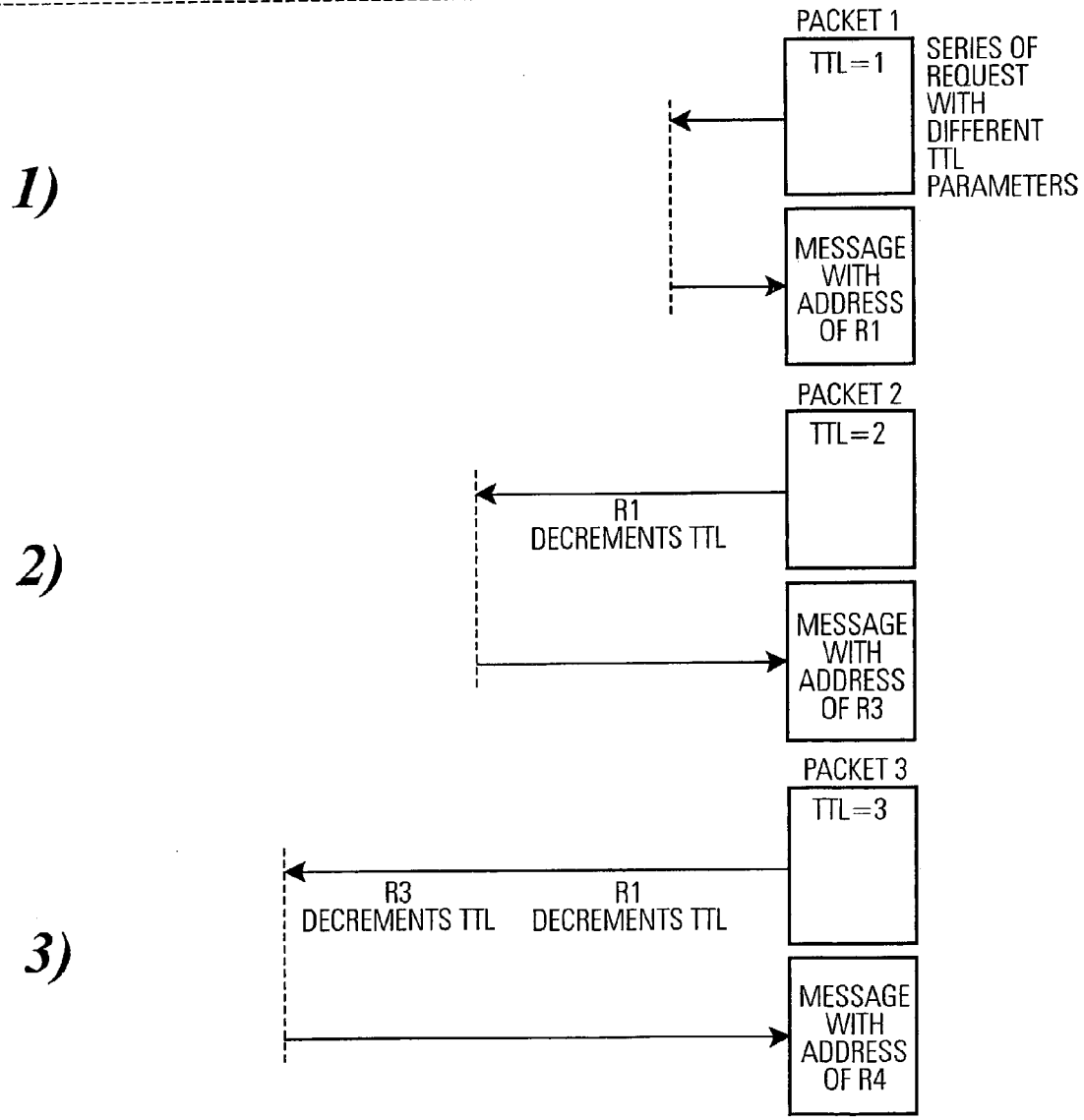

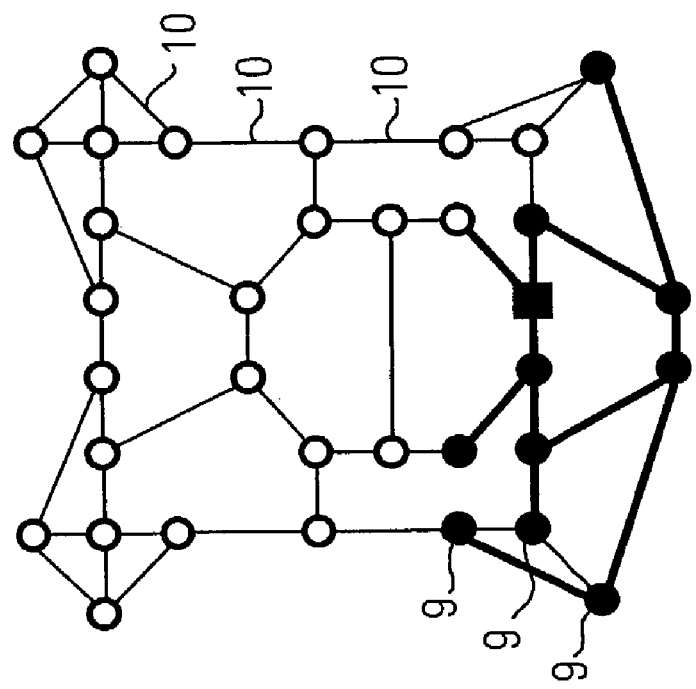
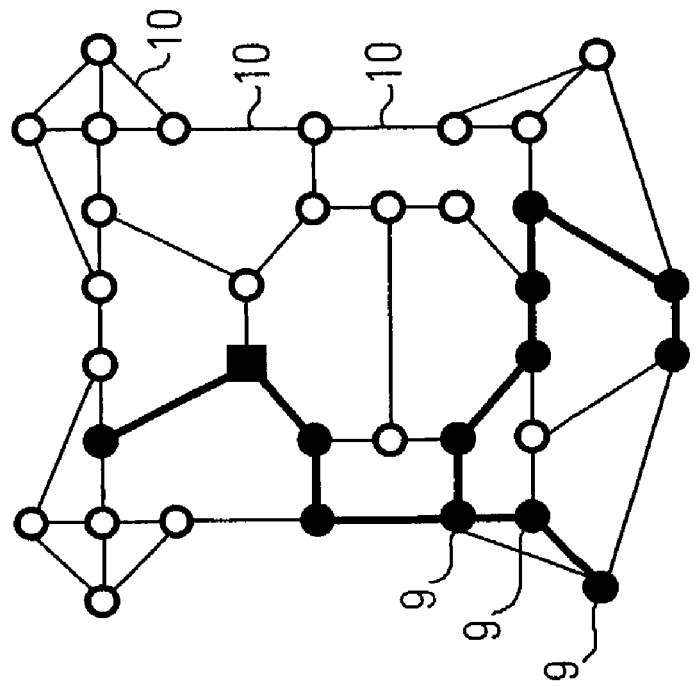
FIG. 7

SYSTEM USING NETWORK TOPOLOGY TO PERFORM FAULT DIAGNOSIS TO LOCATE FAULT BETWEEN MONITORING AND MONITORED DEVICES BASED ON REPLY FROM DEVICE AT SWITCHING LAYER

FIELD OF THE INVENTION

The present invention relates to methods and computer program products for carrying out fault diagnosis in an IT network.

BACKGROUND OF THE INVENTION

Nowadays, as information systems become ubiquitous and companies and organizations of all sectors become more and more dependent on their computing resources, the requirement for the availability of the components of an information technological (IT) network is increasing while the complexity of IT networks is growing. An IT network often comprises a diversity of devices, such as bridges, switches, routers, workstations, servers, etc., and connections between them. Typically, IT networks are not static. Rather, existing devices or connections are often removed, new devices and new connections between devices are added, so that the network topology changes dynamically. Consequently, monitoring and managing of IT networks becomes more and more important, not only for large organizations, but also for medium-sized and small ones.

Topology changes of an IT network can be coped with by available network-discovery software tools which may run in an IT network as a, background job, collect information about the devices within the networks, and provide, as a result, a data representation of the network topology. If such a discovery software runs on a scheduled basis the data representation is automatically updated. For example, Hewlett-Packard offers such a network discovery software under the name "hp asset" which enables the discovery of network elements at the routing layer (e.g. routers) as well as on the switching layer (e.g. switches). A monitoring system with a discovery functionality is also disclosed in European patent application EP 1 118 952 A2.

Known network monitoring and management systems permanently monitor devices of a network to be monitored and provide alert messages to an operator if faults of network devices are detected. Typically, an alert message is generated if a network device which normally sends "alive" messages (either actively or upon request of a monitoring system) stops sending such alive messages, or if a device sends a message expressly indicating the occurrence of a fault.

Network monitoring systems often do not only issue one alert message in the case of a fault of a network device, but rather a number of related messages. For example, if a network router goes down, all devices beyond the router can no longer be reached. As a consequence, the monitoring system will not only issue messages indicating that the router is down, but will also output a large number of related messages that the devices beyond the router are not available. Due to the number of network devices and the complex interactions between them, it is difficult for the operator to resolve the dependencies of the generated messages and to find the origin of the problem. If the operator is flooded by messages, it may even be difficult to detect important alert messages and distinguish them from less important ones, so that there is a risk that the operator overlooks relevant messages.

In order to reduce the number of related messages, it has been proposed that event correlation filter techniques are used, for example in unexamined U.S. patent applications 2002/0138638 A1 and 2002/0169870 A1.

Typically (but not necessarily), non-public IT networks—also called intranets—are constructed using the technology of the Internet, which is a global public network implementing the TCP/IP protocol suite. (Regarding the meaning of the term "TCP/IP protocol suite", see W. Richard Stevens: TCP/IP Illustrated, Volume 1, The Protocols, 1994, pages 1-2). Parts of the TCP/IP protocol suite are the Ping program (see Stevens, pages 85-96), the Traceroute program (see Stevens, pages 97-110 and SNMP, the Simple Network Management Protocol (see Stevens, pages 359-388).

SUMMARY OF THE INVENTION

The invention is directed to a computer-implemented method of carrying out fault diagnosis of a monitored device in an IT network. The IT network has a monitoring station. The method comprises: tracing and storing a routing path between the monitoring station and the monitored device; in response to an apparent fault of the monitored device, sending at least one request to a device or devices along the stored routing path; locating the fault to within a subnetwork of the IT network based on whether or what sort of a reply to the request is received from the requested device or devices.

According to another aspect, a computer-implemented method of carrying out fault diagnosis of a monitored device in an IT network is provided. The IT network has a topology and a monitoring station. The method comprises: searching a data representation of the topology for at least one interconnecting path between the monitoring station and the monitored device within at least a subnetwork of the IT network; in response to an apparent fault of the monitored device, sending at least one request to a device or devices along the interconnecting path; locating the fault based on whether or what sort of a reply to the request is received from the requested device or devices.

According to another aspect, a method of carrying out fault diagnosis in an IT network in response to an apparent fault of a monitored device is provided. The method comprises: sending at least one request to a routing layer device or devices of the network along a stored routing path, to locate the fault at the routing layer to within at least one subnetwork; sending at least one request to a switching layer device or devices along an interconnecting path between the monitoring station and the monitored device within the at least one subnetwork; and locating the fault at the switching layer based on whether or what sort of a reply to the request is received from the requested switching layer device or devices.

According to another aspect, a computer-implemented method of carrying out fault diagnosis of a monitored device in an IT network is provided. The IT network has a topology, a routing layer and a switching layer, subnetworks, and a monitoring station. The method comprises: tracing and storing a routing path between the monitoring station and the monitored device at the routing layer; in response to an apparent fault of the monitored device, sending at least one request to a routing layer device or devices along the stored routing path; locating the fault at the routing layer to within one of the subnetworks based on whether or what sort of a reply to the request is received from the requested routing layer device or devices; searching, at the switching layer, a data representation of the topology of at least the located subnetwork for at least one interconnecting path between the monitoring station and the monitored device within at least the located subnetwork; sending at least one request to a switching layer device or devices along the interconnecting path; locating the fault at the switching layer based on whether or what sort of a reply to the request is received from the requested switching layer device or devices.

According to another aspect, a computer-implemented method of carrying out fault diagnosis of a monitored device in an IT network is provided. The IT network has a topology, a routing layer and a switching layer, subnetworks, and a monitoring station. The method comprises: tracing and storing a routing path between the monitoring station and the monitored device at the routing layer; searching, at the switching layer, a data representation of the topology for at least one interconnecting path between the monitoring station and the monitored device; in response to an apparent fault of the monitored device, sending at least one request to a routing layer device or devices along the stored routing path; locating the fault at the routing layer to within one of the subnetworks based on whether or what sort of a reply to the request is received from the requested routing layer device or devices; sending at least one request to a switching layer device or devices along the interconnecting path within the located subnetwork; locating the fault at the switching layer based on whether or what sort of a reply to the request is received from the requested switching layer device or devices.

According to a another aspect, a computer program product is provided. It includes program code for performing fault diagnosis of a monitored device in an IT network, when executed on a monitoring computer system. The program code enables, when executed, a routing path between the monitoring computer system and the monitored device to be traced and stored. The program code is arranged to send, in response to an apparent fault of the monitored device, at least one request to a device or devices along the stored routing path. The program code is arranged to locate the fault to within a subnetwork of the IT network based on whether or what sort of a reply to the request is received from the requested device or devices.

According to a another aspect, a computer program product is provided which includes program code for performing fault diagnosis of a monitored device in an IT network, when executed on a monitoring computer system. The IT network has a topology. The program code enables, when executed, a data representation of the topology to be searched for at least one interconnecting path between the monitoring computer system and the monitored device within at least a subnetwork of the IT network. The program code is arranged to send, in response to an apparent fault of the monitored device, at least one request to a device or devices along the interconnecting path. The program code is arranged to locate the fault based on whether or what sort of a reply to the request is received from the requested device or devices.

According to a another aspect, a computer program product is provided which includes program code for performing, when executed on a monitoring computer system, fault diagnosis in an IT network in response to an apparent fault of a monitored device. The program code is arranged to send at least one request to a routing layer device or devices of the network along a stored routing path, to locate the fault at the routing layer to within at least one subnetwork. The program code is arranged to send at least one request to a switching layer device or devices along an interconnecting path between the monitoring station and the monitored device within the at least one subnetwork. The program code is arranged to locate the fault at the switching layer based on whether or what sort of a reply to the request is received from the requested switching layer device or devices.

According to a another aspect, a computer program product is provided which includes program code for performing fault diagnosis of a monitored device in an IT network, when executed on a monitoring computer system. The IT network has a topology, a routing layer and a switching layer, subnetworks. The program code enables, when executed, a routing path between the monitoring computer system and the monitored device at the routing layer to be traced and stored. The program code is arranged to send, in response to an apparent fault of the monitored device, at least one request to a routing layer device or devices along the stored routing path. The program code is arranged to locate the fault at the routing layer to within one of the subnetworks based on whether or what sort of a reply to the request is received from the requested routing layer device or devices. The program code enables a data representation of the topology of at least the located subnetwork to be searched, at the switching layer, for at least one interconnecting path between the monitoring computer system and the monitored device within at least the located subnetwork. The program code is arranged to send at least one request to a switching layer device or devices along the interconnecting path. The program code is arranged to locate the fault at the switching layer based on whether or what sort of a reply to the request is received from the requested switching layer device or devices.

According to another aspect, a computer program product is provided which includes program code for performing fault diagnosis of a monitored device in an IT network, when executed on a monitoring computer system. The IT network has a topology, a routing layer and a switching layer, and subnetworks. The program code enables, when executed, a routing path between the monitoring computer system and the monitored device at the routing layer to be traced and stored. The program code enables a data representation of the topology to be searched, at the switching layer, for at least one interconnecting path between the monitoring computer system and the monitored device. The program code is arranged to send, in response to an apparent fault of the monitored device, at least one request to a routing layer device or devices along the stored routing path. The program code is arranged to locate the fault at the routing layer to within one of the subnetworks based on whether or what sort of a reply to the request is received from the requested routing layer device or devices. The program code is arranged to send at least one request to a switching layer device or devices along the interconnecting path within the located subnetwork. The program code is arranged to locate the fault at the switching layer based on whether or what sort of a reply to the request is received from the requested switching layer device or devices.

DESCRIPTION OF THE DRAWINGS

In the accompanying drawings:

FIG. 3 illustrates embodiments of tracing methods;

FIG. 7 illustrates the operation of depth-first search and breadth-first search;

DESCRIPTION OF THE PREFERRED EMBODIMENTS

Figure 1:
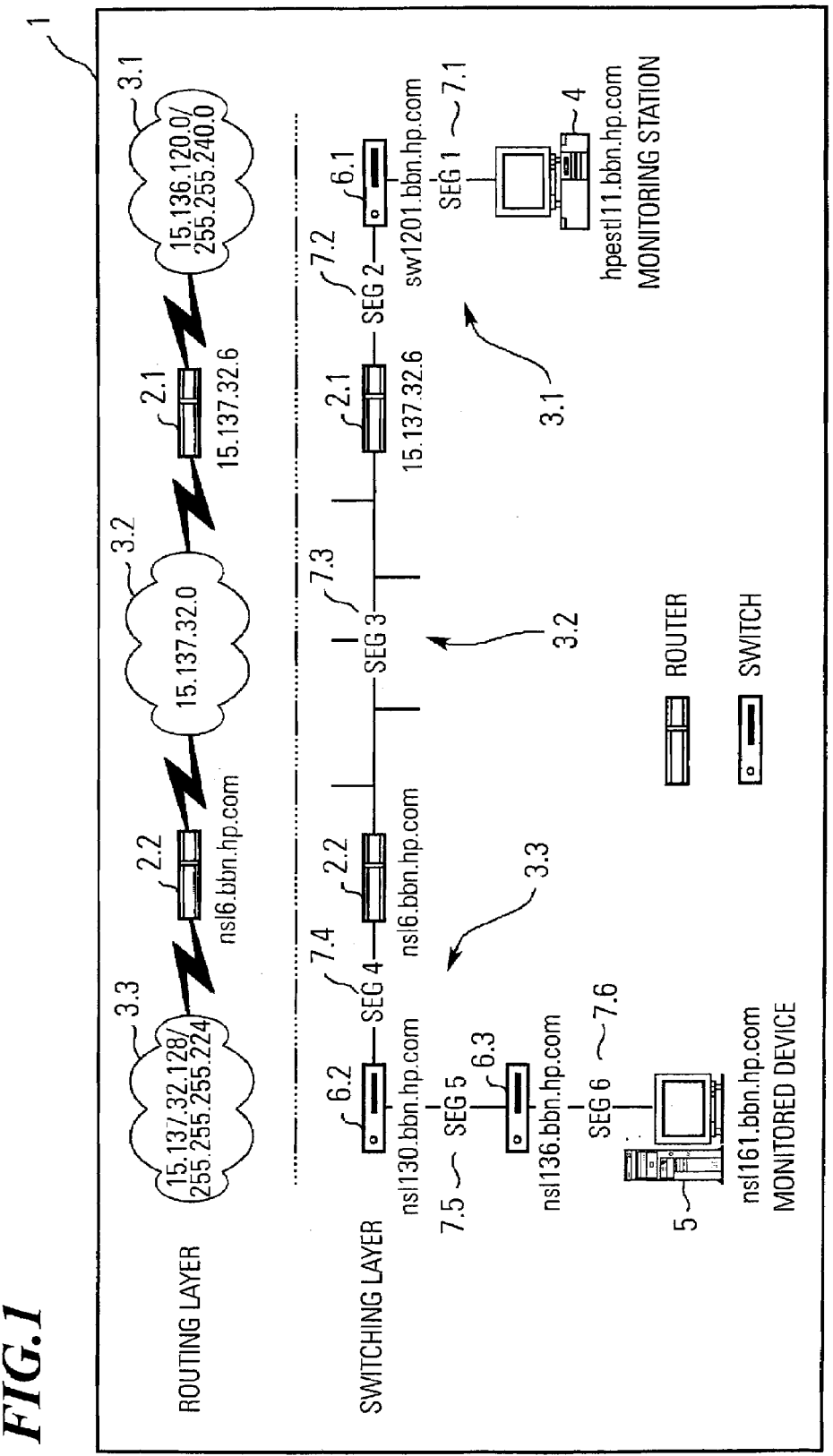
FIG. 1 is a routing layer and a switching layer representation of an exemplary embodiment of an IT network in which a monitoring station is arranged to carry out fault diagnosis of a monitored device.

FIG. 1 is a routing layer and a switching layer representation of an exemplary embodiment of an IT network. By means of FIG. 1, an embodiment of a fault diagnosis method will be explained. Before proceeding further with the description of FIG. 1, however, a few items of the embodiments will be discussed.

In some of the preferred embodiments, the IT network is a non-public computer network (intranet), but in other embodiments, it may be a public computer network or a telecommunication network. The IT network is preferably, but not necessarily, a TCP/IP network.

In the literature, the term "network" is used in different meanings: in a generic meaning, the term "network" refers to any system of interconnected computers. In a more specific meaning, the term "network" refers, for example, to a collection of computers interconnected by a single technology (see, for example, A. S. Tanenbaum: Computer Networks, fourth edition, 2003, Pearson Education International, pp. 1-3). According to another specific meaning, "network" refers to a collection of hosts which have a common IP network identifier (netid) in their IP address (see, for example, Stevens, pp. 7-9, and Tanenbaum, pp. 436-438). A "network" in the first-mentioned, generic meaning is then considered as a "network of networks", and is consequently often referred to as an "internetwork" (the name "Internet" is derived from that; it refers to the global public internetwork in which machines run the TCP/IP protocol suite, have an IP address and can send IP packets to all other machines on the Internet; see Tanenbaum, page 56). In the present description, however, a different terminology is used: the terms "IT network" and "network" are herein used in the first-mentioned generic meaning according to which they refer to a collection of interconnected devices; this collection may be an "internetwork" of several "networks" in one of the above-mentioned specific meanings. A typical IT network is a non-public LAN, but it may also comprise parts of a public network, such as the Internet, if the networked computers of interest are connected via the Internet. Such an IT network is divided into smaller parts by routing-layer interconnect devices ("routers"). These parts are called "subnetworks" herein (in the above-mentioned specific terminology, these subnetworks are the "networks"). It should be noted that meaning of subnetwork, as used herein, is not exactly the same as "subnet" used in the Internet Protocol terminology: in the IP terminology, a "network" is a collection of hosts the IP addresses of which are identical in an address field called "network identifier" ("netid"). The length of the netid field is 7 bits, 14 bits or 21 bits for what is called Class A, Class B or Class C addresses (see Stevens, pp. 7-9). A "subnet" in the IP terminology is a collection of hosts having, in addition, an identical IP subnet identifier. The subnet identifier may have variable lengths, in order to enable subnetworks of different sizes to be addressed, which is known as Classless InterDomain Routing (CIDR) (see, for example, Stevens, pp. 140-141; and Tanenbaum, pp. 436-444). Consequently, if subnet identifiers are used, the meaning of "IP subnet" corresponds to the one of the "subnetwork", as used herein. However, if no subnet identifiers, but only the network identifiers are used to address different collections of hosts, these are called "networks" in the IP terminology, but are "subnetworks" in the terminology used herein (since such a collection is separated by one or more routers from other collections of hosts). Therefore, the term "subnetwork" in the terminology used herein includes "IP subnet" and "IP network".

The IT networks of the embodiments may include machines for running application programs as well as input/output devices, such as servers, workstations, desktop computers, printers, etc., collectively referred to as end devices. The monitoring station and the monitored device are also end devices. The end devices are networked by transmission lines and interconnect devices, such as routers, switches (the term "switches" also includes "bridges" since bridges can be considered as switches with a small number of ports), hubs, etc. The transmission lines may be made of conducting wire, optical fiber, or radio or infrared links.

The different interconnect devices, such as hubs, switches and routers, act on different layers of abstraction. In what is known as the "OSI Reference Model" communication within a network is based on a physical layer, a data link layer, a network layer and four further layers (see, for example, Tanenbaum, pp. 37-41). Another model, the TCP/IP Reference Model is based on similar layers, wherein the data link layer (together with the physical layer) is called "Host-to-network layer", and the network layer is called "Internet layer" (see, for example, Tanenbaum, pp. 41-49; Stevens, pp. 1-7). A different terminology is used herein: the Data link/Host-to-network layer is called "switching layer", and the Network/Internet layer is called "routing layer". The interconnect devices hub-switch-router operate at different layers; in particular, switches and routers use different pieces of information to decide how to switch or route. In a typical scenario, an end device generates some data to be sent over the IT network to another end device. This data is passed to the routing layer within the first end device, where a routing layer header is added to the data to form a routing layer packet, for example, an IP packet. Then, still within the first end device, the packet goes to the switching layer, which adds its own header to the routing layer packet to form a switching layer frame and gives the frame to the physical layer for transmission over the network (see Tanenbaum, p. 326).

If one looks at the interconnect devices at the different layers, one finds the hubs at the bottom, in the physical layer. A hub has a number of input lines that it joins electrically like a cable splitter. Signals arriving on any of the lines are sent out on all the others. Hubs do not usually have an IP address, are thus rarely discovered by a typical discovery program, and are not included in the present fault diagnosis. Rather, they are considered as a transparent part of a communication line in the present context. Some hubs provide SNMP management capabilities, but those are no longer state of the art technology.

If one moves up to the switching layer one finds switches as interconnected devices. Switches connect segments of a subnetwork. When a frame arrives, software in the switch extracts the switching layer destination address from the frame header to see where to send the frame. For Ethernet, this address includes the 48-bit-MAC address which is a hardware address uniquely identifying a device. A switch does not examine routing layer addresses, such as IP addresses (see Tanenbaum, pp. 327-328).

Moving up to the routing layer, one finds routers as interconnect devices. When a frame comes into a router, the routing layer packet is extracted from the frame and the routing layer address in the routing layer packet is used for deciding where to send it. For an IP packet, the packet header will contain a 32-bit (IPv4), or 128-bit (IPv6) IP address, but not a 48-bit MAC address. The routing software in the router does not see the switching layer addresses and does not even know whether the frame came on a broadcast network or a point-to-point line, for example (see Tanenbaum, p. 328 and pp. 420-422).

Routers have their own routing layer address, e.g. IP address, to which requests such as Ping or SNMP requests may be directed, for example to find out whether a router is available. It should be noted that IP addressing does not actually refer to devices, but to network interfaces. So, if a device has more than one network interface, such as a router, it has a corresponding number of IP addresses. Therefore, if it is herein mentioned that a fault is located to within a subnetwork, this does not necessarily mean that the fault is located between the routers defining the subnetwork (excluding the routers), but rather includes the routers' respective network interfaces which belong to the subnetwork. One can say (although not absolutely precisely) that a router belongs to the two (or more) subnetworks to which its interface devices belong. Since typically a router is "down" as a whole, and not simply one of its network interfaces, defining herein that "a fault is located to within a subnetwork" does not therefore specifically refer to the particular network interface which actually belongs to the subnetwork, but includes that a router having a network interface in the subnetwork as a whole may be faulty, not only the particular network interface. For the same reason, echo requests sent to a router to verify its availability do not necessarily refer to a particular one of the router's network interfaces, but may refer to any one of its network interfaces. If it turns out that any one of the router's interfaces is available, it can be concluded that the whole router is available; and similarly, if it turns out that any one of the router's interfaces is unavailable, it can be concluded that the whole router is unavailable.

Typically, switches also have a routing layer address (e.g. an IP address), although they do not use routing layer addresses (IP addresses) in their switching decision. This also allows requests to be sent, such as Ping or SNMP requests, to a switch to find out whether it is available.

In the embodiments, a monitored device may be any device within the IT network having a routing layer address, e.g. an IP address, such as an end device (e.g. a server, workstation, desktop computer, printer, etc.) or an interconnect device (e.g. a router switch). Typically (but not necessarily), not only one, but a large part or even all of the addressable devices of an IT network are monitored by the monitoring station. However, for simplicity the present description of embodiments of the fault analysis focus on the monitoring of only one device. The methodologies described in this context can be easily extended to the monitoring of many devices, essentially by sequentially applying the methodology of single-device monitoring to each of the devices.

Generally, monitoring may focus on various questions. For example, one question may be whether a monitored device is available (i.e. running) or unavailable. Other types of monitoring may try to determine a degree of availability, for example the present amount of disk space in a computer, the present amount of available paper in a printer, etc. Some types of monitoring may collect non-fatal events of monitored devices or applications running on it which may be used as indications for potential future problems. The embodiments of the fault diagnosis focus on availability monitoring, i.e. whether the monitored device is available or unavailable. Typically, an unavailable device does not respond to requests anymore, and an unavailable interconnect device (router or switch) does not forward any packets from one subnetwork or segment to another one any more. However, there may be cases in which a device, although unavailable, can still respond to a request and indicate its unavailability in the response.

There are different ways in which monitoring may be carried out. In some of the embodiments, the monitoring is based on a request-response protocol: the monitoring station is programmed to send from time to time an echo request to the monitored device, for example using the Ping program, and to expect a response to the echo request (called "echo response") from the monitored device. If the monitoring station does not receive the expected echo response, an (apparent) fault of the monitored device is detected. In other embodiments, the monitored device (or an agent running on it) is arranged to regularly send messages (without request) to the monitoring station. The monitoring station detects an (apparent) fault of the monitored device if no message is received from it within a period sufficiently long compared with the expected period between two messages. Both protocols may be combined: For example, if the monitored device is arranged to send messages on a regular basis, and no such message is received within the expected period, the monitoring station may send an echo request, and only if the unavailability is verified by the absence of an echo response, detect an (apparent) fault of the monitored device.

If a fault is detected because the monitored device appears unavailable to the monitoring station it is, however, not clear that the monitored device is actually unavailable. Rather, the root cause for the apparent fault of the monitored device could be any of the following:

(a) the monitored device is unavailable due to a fault of the monitored device itself;

(b) one or several routing layer interconnect devices (routers) have failed;

(c) one or several segment-layer interconnect devices (switches) have failed;

(d) a communication line (including repeaters, hubs etc.) has failed.

In the embodiments, the root cause of a fault is found or at least narrowed down by identifying the path between the monitoring station and the monitored device (i.e. identifying the or at least some of the interconnect devices on that path) and sending one or more requests (e.g. echo requests) to the identified interconnect devices. If a response (e.g. an echo response) is received from a requested interconnect device it can be concluded therefrom that the requested interconnect device and all interconnect devices and communication links between it and the monitoring station are in order, i.e. that neither of them is the root cause of the fault. If the next device beyond the available device furthest from the monitoring station does not respond to a request, it may be concluded therefrom that the fault is located in that subnetwork or segment which is beyond the available device furthest from the monitoring station or in the next device itself. Depending on what interconnect devices (routers and/or switches) are included in the fault diagnosis, the fault can consequently be narrowed down to within a subnetwork and a router (or the monitored device) or a segment and a switch (or the monitored device).

Finding the actual path which is taken by data frames from the monitoring station to the monitored device and vice versa may be involved, mainly due to the fact that an IT network may generally provide more than only one possible path from the monitoring station to the monitored device. In the language of graph theory, a graph representing an IT network may have circles which enable the monitored device to be reached from the monitoring station (and vice versa) along several paths. Furthermore, routing in IP networks is typically dynamic, so that a path at the routing layer (i.e. a route) is not fixed, but may change from time to time, theoretically even from packet to packet. It should be noted that, although the embodiments can cope with such multi-path networks, they do not require the IT network to have more than one path. They of course work also in single-path networks, e.g. tree-like IT networks.

A way of finding the routing path (i.e. the path at the routing layer) between the monitoring station and the monitored device is by tracing the path which is actually taken by packets between the monitoring station and the monitored device, before the fault occurs (for simplicity, it is assumed that the actual path is the same in the direction to and from the monitored device). Since in dynamic networks the actual path may change from time to time, the step of tracing and storing the routing path is preferably repeatedly carried out, e.g. on a regular scheduled basis (for example, every hour), and the latest stored path is then used in the case of a fault for the subsequent fault-locating procedure. Assuming that the routing path is stable over relatively long periods (which is a good assumption for many networks), the probability that the actual path has changed within the typically shorter period between the last tracing and the occurrence of the fault is relatively small, so that the last traced routing path is probably the actual one. In some embodiments, however, not only the last traced routing path is stored, but rather the last n traced routing paths, wherein n is a number larger than 1 (for example, 5). If a fault occurs, the n stored paths are compared with one another, and if a change is found within the n stored paths, the subsequent fault-locating procedure is not only carried out for the last stored path, but also for one or more of the different previously stored paths. These embodiments cope with rare situations in which communication in an IT network "oscillates" between two or more different routing paths.

In the embodiments, the devices which are identified in the tracing step are routing-layer devices, i.e. routers. This is due to the fact that the currently most widely used IP protocol suite provides record-route or expired-TTL functionalities at the routing layer (described below), but does not analogously enable devices at the switching layer (switches) to disclose their presence and identity upon switching frames. Therefore, in the embodiments other methods, namely topology search methods, are used in order to find possible paths at the switching layer. However, other network technologies which also enable switches to disclose their presence and identity, upon switching, tracing and storing actual paths may also be performed at the switching layer.

In some of the embodiments, the tracing is based on sending a packet with a record-route functionality from the monitoring station to the monitored device, or vice versa, which causes routers along the routing path to identify themselves. For example, the IP protocol includes a Record route option which tells the routers along the path to append their IP address to an option field of the packet (see Tanenbaum, pp. 433-436). For example, in embodiments in which the monitoring is arranged such that the monitored device regularly sends "alive" messages to the monitoring server, the record-route functionality may be activated so that the router identification information is added to the corresponding packets when routed from the monitored device to the monitoring station. In other embodiments, the monitoring station sends an echo request to the monitored device with the IP record-route option enabled, for example by using the Ping program (see Stevens, pp. 91-95). These echo requests may, at the same time, serve to monitor the monitored device, but in other embodiments, monitoring and tracing with a record-route option use separate data transmissions or requests. When a Ping echo request with a record-route is sent from the monitoring station to the monitored device, the routers along the routing path are caused to add their IP address to the option field in the corresponding IP packet, and the monitored device returns the list of the router's IP addresses found in the option field with its echo response to the monitoring station, which in turn stores the list as the routing path. However, the IP record-route functionality has certain problems: (i) the IP header has limited room which enables only nine IP addresses to be recorded, i.e. longer routes cannot be traced; (ii) not all routers on the market support the record-route functionality, i.e. a recorded route may be incomplete if such routers are used.

In order to circumvent these problems, other embodiments apply another tracing method which is based on a technique according to which a packet has a time-to live (TTL) or hop-count parameter decremented by each router, wherein a router which gets a packet whose TTL or hop-count parameter is 0 or 1 must not forward the packet, but rather return a message to the originating host which includes the router's address. In the IP protocol, a TTL field is provided in the IP header of an IP packet. Each router that handles the packet is required to decrement the TTL parameter by either one or the number of seconds that the router holds onto the packet. Since most routers hold a packet for less than a second, the TTL parameter has effectively become a hop counter decremented by one by each router. When a router gets an IP packet whose TTL is either 0 or 1, it throws away the packet and sends back to the originating host an ICMP (Internet Control Message Protocol) message "time exceeded". The IP packet containing this ICMP message has the router's IP address as the source address (see Stevens, pp. 97-99). The whole path from the monitoring station to the monitoring device is traced by sending a series of packets with a varying time-to-live or hop-count parameter, for example a series with parameters increasing from one to a number larger than the number of routers along the path, or a series with correspondingly decreasing parameters. Since each router will then receive a packet in which the time-to-live or number of hops is exceeded, each router along the routing path is caused to return a message including its address, thereby enabling identification of all the routers along the routing path. In the preferred embodiments, the Traceroute program is used which implements such a TTL-parameter-based route tracing (see Stevens, pp. 97-99).

When a fault of the monitored device has been detected, requests are sent by the monitoring station to the routers along the stored routing path in order to locate the root cause of the detected fault at the routing layer. In the preferred embodiments, these requests are echo requests (for example, Ping requests), and the reply returned by a requested router—provided that it is still available and reachable—is a corresponding echo reply (for example, a reply to the Ping request). If there are more than one router along the routing path, a series of requests is sent to them. Various request sequences are possible. For example, in some embodiments, the requests are sequentially sent to the routers along the routing path beginning with the router nearest to the monitoring station. The request procedure can be stopped as soon as the first unavailable router is found (since sending requests to routers further away from the monitoring station would not provide additional information, since those routers will be unreachable). Alternatively, the request sequence may start with the router furthest from the monitoring station and approach, along the routing path, the monitoring station. It may be stopped as soon as the first available router is found. In other embodiments, a more efficient (but also more complicated) method is used which resembles a binary search: first, a request is sent to a router in the middle of the routing path which divides it into two halves. The following requests are iteratively sent to the middle of that half of the routing path further away from the monitoring station if the router is found to be available, or to the middle of the other half, if it is found to be unavailable. The procedure may be stopped when an unavailable router adjacent to an available router is found.

As a result of any one of these embodiments, the fault is located in that subnetwork which lies beyond the router furthest from the monitoring station that returns a reply (indicating normal functioning) to the monitoring station. According to the above discussion pertaining to routers and their network devices, the "subnetwork" also includes the next router on the routing path beyond the router furthest from the monitoring station that returns a reply.

In order to locate a fault at the switching layers, similar locating procedures may be carried out at the switching layer. However, since switches are not aware of the routing layer protocol (e.g. the IP protocol) or routing layer addresses (e.g. IP addresses) another method, a topology search method, is used instead of the tracing method described above. In some of the embodiments, the switching-layer fault-location method is used in conjunction with the above-described routing path tracing and fault locating, so as to narrow down the fault to a switch or a segment adjacent to it. In other embodiments, the switching-layer fault-locating method is used alone, without the above-described routing-layer fault-locating method, for example in small IT networks with only one monitored subnetwork, or in networks with protocols which do not use IP-like routing features, such as IPX, AppleTalk. In turn, the above routing-layer fault-locating method may be used without the switching-layer fault-locating method described below, if the "granularity" achieved by the former is considered to be acceptable.

At the switching layer, information about the actual path taken by frames from the monitoring station to the monitored device (or vice versa) is typically not available, in contrast to the routing layer, where the abovedescribed tracing methods can be used. Therefore, in some embodiments of the topology search method all possible paths connecting two routers (or a router and the monitoring station or the monitored device) at the switching layer, but not the actual path are determined from the known topology of the IT network.

Generally, the topology of the IT network at the routing and switching layers will be known and a representation of it be stored (for example in a database in the monitoring station) and available for monitoring and management purposes. The IT network topology at the routing and switching layers may, for example, be automatically generated by a network discovery software, for example by the commercially available "hp asset" software by Hewlett-Packard. Routers and switches may be found by sending a "trial PING request" to possible IP addresses in a subnetwork. At the routing layer, further information can be obtained from ARP caches or routing tables in routers, which can be accessed by the discovery system, for example by means of the Simple Network Management Protocol (SNMP). The discovery of the switching layer may be based on information, for example, hardware (MAC) addresses, stored in switches indicating to which other devices frames have been forwarded in the recent past. This information may also be obtained by SNMP. These hardware addresses are then correlated with the discovered routers and their hardware addresses. Thereby, the connections between routers, switches and end devices may be reconstructed. Of course, the use of a topology representation which has been generated by automatic discovery is optional. It is likewise possible to use a topology representation which has been manually defined and maintained by the designer and/or an operator of the IT network.

As a result of the searching step, the interconnecting path between the monitoring station and the monitored device within at least a subnetwork of the IT network is determined at the switching layer, i.e. the switching layer device or devices and their relative arrangement along the interconnecting path are identified. In some embodiments, if more than one interconnecting path is topologically possible, all possible interconnecting paths are identified. In some embodiments in which the topology search method is combined with the above-described tracing and fault location method at the routing layer so as to narrow the fault location down to the switching layer, the search for possible interconnecting paths may be limited to that part of the total interconnecting path of the monitoring station and the monitored device which traverses the subnetwork, in which the fault has previously been located by the routing layer fault location method. Therefore, in these embodiments, the topology searching step at the switching layer is carried out only after a fault of the monitored device has been detected and the results of the routing-layer fault locating method have been obtained. In these embodiments, the topology search—which may take considerable computing time for larger networks—can therefore be limited to only one subnetwork; on the other hand, the topology search is then only carried out after a fault has been detected.

In other embodiments the step of searching the network topology at the switching layer is carried out prior to the detection of a fault and its location at the routing layer. In some of these embodiments, however, the topology search depends on the results of the tracing step because the topology search is only carried out for those paths at the switching layer which actually interconnect routers (or a router and the monitoring station or a router and the monitored device) lying on the actual routing path between the monitoring station and the monitored device found in the tracing step. When a fault is detected and located at the routing layer to within one of the subnetworks, that one (or those ones) of the previously found switching layer interconnecting paths is (are) selected which is (are) within the located subnetwork, i.e. which connects (connect) the last available router (or the monitoring station) and the first unavailable router (or the monitored device). In other embodiments, the switching layer topology search is not only carried out "to fill the gaps" along the actual routing path, but along all the possible routing paths between the monitoring station and the monitored server. In those embodiments the topology searching step is independent from the tracing step, and can therefore be carried out before it (although this is not mandatory). The switching layer paths found are then stored. When a fault has been detected and located to within a certain subnetwork, only that (those) switching layer path (paths) of the stored paths which are within the located subnetwork and interconnect the last available router (or the monitoring station) and the first unavailable router (or the monitored station) of the actual routing path found in the tracing step are selected and used in the then following switching layer locating step. Although in embodiments in which the switching layer topology search is carried out before the fault has been detected and located, more computing time is needed (since paths are also searched which are not within the (not yet located) subnetwork or even do not lie on the actual routing path), these embodiments may need less computing time after the detection of a fault to locate it at the switching layer, since the time-consuming topology search may be carried out in advance.

After a fault has been detected and located to within a subnetwork (which may include a router) and after the interconnecting path (or paths) in that located subnetwork has been found in a topology search (or selected from previously found and stored paths), requests are sent by the monitoring station to the switching layer devices along the interconnecting path (or paths). Although the switching layer devices are not visible at the routing layer, they typically have an IP address and are arranged to respond to IP echo requests, such as PING or SNMP echo requests. If a switching layer device is available, it will return a response to such a request to the monitoring server. If it is not available, it will typically return no response or a response which indicates the non-availability of the switching layer device. Therefore, by sending such a request to the switching layer device (if there is only one) or a sequence of such requests (if there are more than one) along the found interconnecting path (or paths), the fault can be located at the switching layer. The way in which requests are sent to the switching layer devices (e.g., whether one or more requests per device are sent, in what sequence the requests are sent, whether the request sequence is stopped as soon as an unavailable device is found, etc.) corresponds to the way described above in connection with requests sent to routing layer devices, so that reference can be made to that description. As a result of this request procedure at the switching layer, the fault is located in the unavailable switch nearest to the monitoring station or the segment connecting that switch with the available switch or router furthest from the monitoring station (or with the monitoring station itself). If there is no unavailable switch, the fault is located beyond the last available switch of the subnetwork i.e. in the router at the exit from the subnetwork (or in the monitored device itself) or the segment connecting them. In other words, the diagnosis method can isolate the root cause to be one of the following two problems: (a) a certain device (i.e. a certain router or a certain switch or the monitored device itself) is the faulty device; and (b) the segment (i.e. the cabling) before that device (seen from the monitoring station's perspective) is interrupted.

One difference between the locating procedures at the routing layer and at the switching layer is that the availability of devices at the routing layer is generally determined along the actual path (except for those cases in which the actual path has been found to be oscillating, so that more than one of the oscillating paths is included in the locating procedure), whereas the availability of switching layer devices is determined on the basis of possible interconnecting paths. In the case that there is only one possible interconnecting path, it must be the actual path. However, there are cases in which there are more than one interconnecting path (e.g. sometimes two switches are arranged in parallel in order to increase the availability of the connection through the subnetwork). In such cases, in some of the embodiments all possible interconnecting paths are included in the switching layer locating method, i.e. requests are sent to the switching layer devices along all possible interconnecting paths, although data frames sent from the monitoring station to the monitored device, or vice versa, actually have taken only one of them.

In some of the embodiments, an aim of the topology search is to find, in a given network topology, the possible interconnecting paths between a starting point and a destination point at the switching layer. If the subnetwork under consideration is a transit subnetwork, the start and destination points may be represented by the entrance router and the exit router. If the subnetwork under consideration contains a monitoring end device (i.e. the monitoring station or the monitored device), the start and destination points may be the monitoring station and an exit router, or an entrance router and the monitored device. In a particular case the monitoring station may be the start point, and the monitored device the destination point (if both are located in the same subnetwork). In a more general view (which will be applied below), all possible interconnecting paths are found between two segments of the subnetwork, a start segment and a destination segment. The start segment is the segment connected to the entrance router (or the monitoring station), and the destination segment is the segment connected to the exit router (or the monitored device).

The problem of finding the interconnecting paths is similar to the problem of getting from one place to another in a maze. It may happen that some of the places of the maze are visited several times, but others are never found. Even worse, in a maze with several parallel ways it may happen that one goes round in circles repeatedly without noticing it. Searching a network for paths interconnecting a start and a destination segment is, in principle, beset with similar problems.

There are, however, known graph algorithms which enable a graph to be traversed and all nodes of the graph to be visited. In these algorithms, a sort of "bookkeeping" is performed recording all the edges and nodes of the graph that have already been visited. By means of the bookkeeping information, the algorithms can avoid being trapped in a circle. Visiting all nodes via all possible paths is ensured by systematically traversing the graph. Such graph algorithms are for example described in more detail in R. Sedgewick: Algorithms, Addison-Wesley, $2^{nd}$ edition, 1988, pp. 415-435. The possible paths between a given start node and a given destination node can be found by such a "node-visiting" procedure when used in a way in which it carries with it a vector for holding all visited nodes and edges. If then a path from the start node to the destination node is found, this vector contains the relevant information on the path and may be stored separately. When the procedure has terminated, the set of all such stored vectors represents all the possible paths between the start node and the destination node.

In some of the embodiments, the graph search algorithm used is the "Depth-first search" (see Sedgewick, pp. 423-430), while other embodiments use the "Breadth-first search" (see Sedgewick, pp. 430-434). The Depth-first search explores the graph by looking for new nodes far away from the start node, taking closer nodes only when dead ends are encountered; in contrast, Breadth-first search completely covers the area close to the starting point, moving farther away only when everything close has been looked at (see Sedgewick, p. 433). Apart from these different ways of traversing the graph, both search methods provide all possible paths between the start node and the destination node.

The topology of the subnetwork of interest may be mapped in various ways to the graph on which the search is carried out. In some of the embodiments a sort of "natural" mapping is used: the switches of the subnetwork are mapped to nodes of the graph, and the segments between the switches are mapped to edges of the graph. However, since in a graph all the edges are "terminated" by a node, also routers and end devices of the subnetwork are then mapped to nodes of the graph. In order to avoid the inclusion of routers and end devices, in other embodiments a different mapping method is implemented in which the switches and the segments are mapped to respective nodes of the graph, wherein the edges of the graph connect the switch nodes and segment nodes. The more preferred embodiments use a still different mapping method which avoids two different sorts of nodes: the segments of the subnetwork are mapped to nodes and the switches to edges of the graph. In this latter graph representation of a (sub)network, the aim of the search algorithm is to find all possible paths in the graph between the start segment (i.e. the start node of the graph) and the destination segment (i.e. the destination node of the graph). A path found includes the switches (i.e. the edges of the graph) along the path which are represented by the edges of the path. Irrespective of which particular search algorithm and topology mapping is used, the graph search provides all the possible interconnecting paths (including all the switches lying on these paths) of the subnetwork of interest.

The embodiments of the computer program products with program code for performing the described fault diagnosis include any machine-readable medium that is capable of storing or encoding the program code for execution by a monitoring computer system. The term "machine-readable medium" shall accordingly be taken to include, but not to be limited to, solid state memories, and optical and magnetic storage media. The program code may be machine code or another code which can be converted into machine code by compilation and/or interpretation, such as source code in a high-level programming language or virtual-machine code. The fault diagnosis program is preferably written in an object-oriented program language, such as C++ or Java, or in any other suitable imperative or functional programming language.

The hardware on which the software (or program code) is executed so as to carry out fault diagnosis of the monitored device is a computer system (referred to as "monitoring computer system" or "monitoring station"), for example including a processor and a main memory which communicate with each other via a bus, as well as a network interface device and a disc drive unit and, optionally, input/output units (such as a video display unit, an alphanumeric input device and a cursor control device). The computer system is connected to the IT network by means of the network interface device. The program code may be stored on the disc drive unit, within the main memory and/or the processor and may be transmitted or received via the network interface device.

Returning now to FIG. 1, it shows a routing layer and a switching layer representation of an exemplary embodiment of an IT network 1 arranged to carry out a fault diagnosis of a monitored device by a monitoring station. At the routing layer, the network 1 is divided by two routing-layer interconnect devices (routers) 2.1, 2.2 into three subnetworks 3.1, 3.2, 3.3. The subnetworks 3.1 and 3.3 are shown to have exemplary IP addresses with IP subnet masks 15.136.120.0/255.255.240.0 and 15.137.32.128/255.255.224. Subnetwork 3.2 has IP address 15.137.32.0. The router 2.1 has IP address 15.137.32.6 and router 2.2 is identified by the name nsl6.bbn.hp.com. Since switches do not participate in the routing of IP packets, they are not shown in the routing-layer representation of FIG. 1. The monitoring station 4 (which is an end device within network 3.1) and the monitored device 5 (which is an end device within network 3.3) are not shown in the routing-layer representation of the network 1 either, since end devices are typically not displayed in such routing-layer representations.

In the switching layer representation of network 1 in FIG. 1, besides the routers 2 also switching-layer interconnect devices (switches) 6 are shown which divide the subnetworks 3 into segments 7. Subnetwork 3.1 has one switch 6.1 (named sw1201.bbn.hp.com), subnetwork 3.2 has no switch, and subnetwork 3.3 has two switches 6.2, 6.3 in series (named ns1130.bbn.hp.com and ns1136.bbn.hp.com). Consequently, subnetwork 3.1 has two segments 7.1, 7.2; subnetwork 3.2 has one segment 7.3; and subnetwork 3.3 has three segments 7.4, 7.5 and 7.6. The monitoring station 4 (named hpest11.bbn.hp.com) lies in segment 7.1 of subnetwork 3.1, and the monitored device 5 (named nsl161.bbn.hp.com) lies in segment 7.6 of subnetwork 3.3.

Typically, an IT network may have additional routers, switches and end devices; but FIG. 1 only shows the two monitoring-related end devices (monitoring station 4 and monitored device 5) and those routers 2 and switches 6 which lie on the interconnecting path between the monitoring station 4 and the monitored device 5. In the example shown in FIG. 1, there is only one interconnecting path. Other embodiments with more than one interconnecting path are described below.

An embodiment of a fault diagnosing method is now explained in connection with FIG. 1: first it is assumed that the network topology at the routing and switching layers (i.e. the configuration of routers 2 switches 6 and end devices 4, 5) is known, as shown in FIG. 1 in the switching-layer representation For example, it may have been automatically acquired by running a network discovery software. It is further assumed that the routing path from the monitoring station 4 to the monitored device 5, as shown at the routing-layer representation of FIG. 1, is already known. It may have been acquired by a tracing method illustrated in FIG. 3. (It should be noted, however, that the switching-layer path shown in the switching-layer representation of FIG. 1 need not yet be identified.) It is now assumed that switch 6.3 is failing. Then, in the embodiment of FIG. 1, the following fault diagnosis steps are carried out:

1. An apparent fault of the monitored device 5 is detected. For example, if the monitoring is based on sending regular Ping requests from the monitoring station 4 to the monitoring device 5, and suddenly no responses to the Ping requests are received at the monitoring station 4 anymore upon which the fault detection may be based.

2. In order to locate the fault to one of the routers 2 or subnets 3, the monitoring station 4 then starts to send Ping requests to all routers 2 along the known route from the monitoring station 4 to the monitored device 5, beginning with the nearest router in the route (i.e. it first pings router 2.1 and then router 2.2).
3. In the present example, the monitoring station 4 receives responses to its Ping requests from both routers 2.1, 2.2, i.e. both routers 2.1, 2.2 are detected to be up and running, which means that routing into the monitored device's subnetwork 3.3 is guaranteed. Thus, the fault is located to within the subnetwork 3.3.
4. Now the switching layer topology of the located subnetwork 3.3 is searched for the interconnection between the last available router 6.2 and the first unavailable router or, if there is no further router as in the present example, the monitored device 5. This may, for example, be done by a depth or breadth search within the switching-layer configuration in the available topology representation of the located subnetwork 3.3.
5. The switching-layer search identifies switches 6.2 and 6.3 as switches interconnecting the last router 3.3 with the first unavailable router or, as in the present example, the monitored device 5.
6. The monitoring station 4 now pings all switches 6 identified in the segment-layer search, beginning with the nearest switch 6.2 relative to the last router 3.2 (i.e. it first pings switch 6.2 and then switch 6.3).
7. Switch 6.2 responds to the ping request, but switch 6.3 does not respond, since it is unavailable.
8. Based on that, the root cause of the fault of monitored device 5 is now isolated to one of the two problems:
    a) The switch cabling in segment 7.5 connecting the available switch 6.2 furthest from the monitoring station 4 with the nearest unavailable switch 6.3 is interrupted;
    b) The nearest unavailable device, here switch 6.3, is the faulty device (for example, the power supply of switch 6.3 might be defective).

Consequently, it has been found that it is not the monitored device 5 which is actually responsible for the apparent fault, but rather an interconnecting device or a segment related to it in the path to the monitoring station, and this faulty device or segment (switch 6.3 or segment 7.5) has been identified. An alert message sent by the monitoring station 4 to an operator may state the root cause of the fault precisely, namely the switch 6.3 or the segment 7.5; other alert messages referring to this fault may be suppressed.

Figure 2:
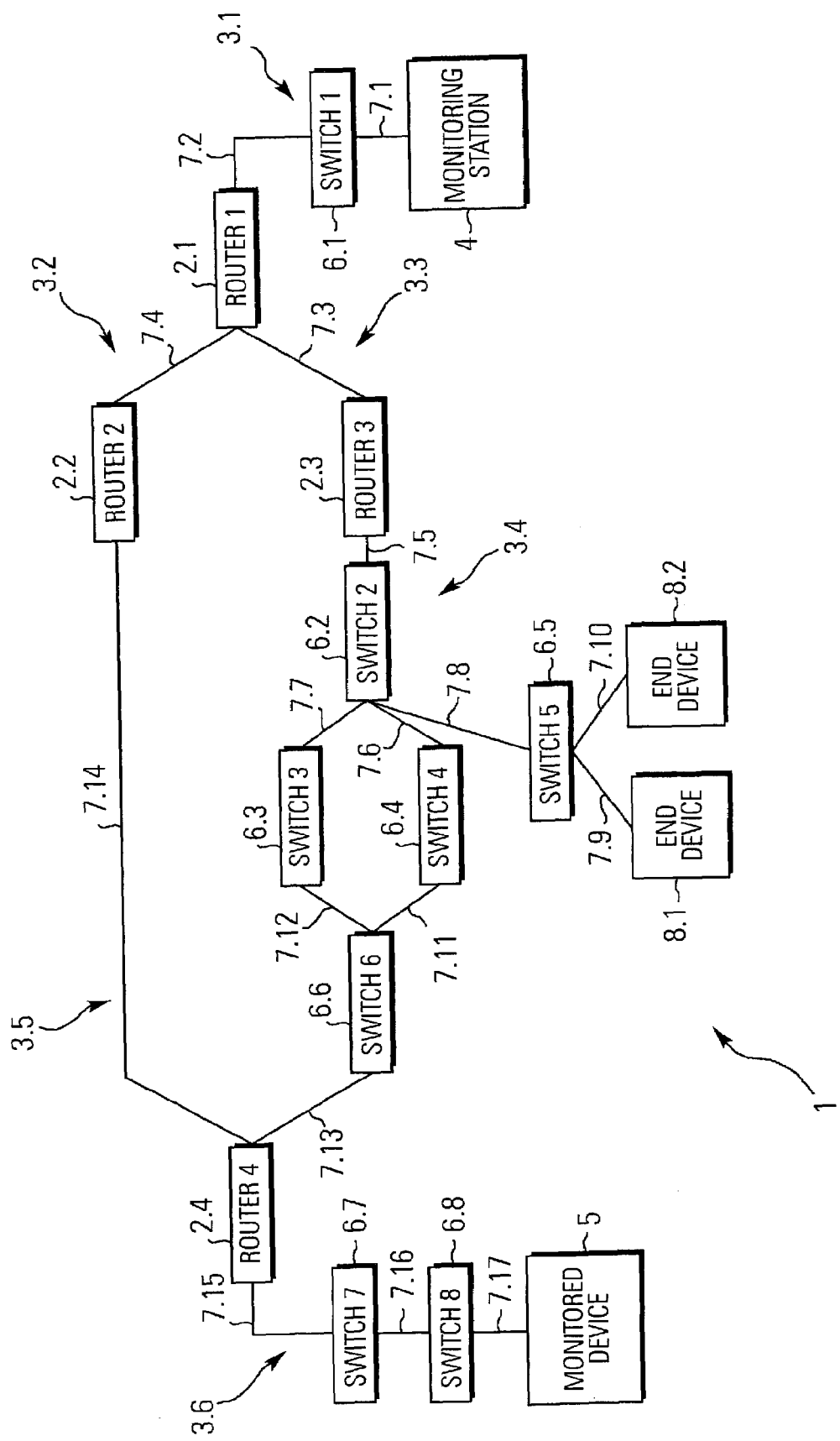
FIG. 2 shows a switching layer representation of another exemplary embodiment of an IT network.

FIG. 2 shows another example of an IT network 1 in a switching layer representation similar to FIG. 1. Compared with FIG. 1, it has two additional routers 2, five additional switches 6, and two additional end devices 8.1, 8.2. The additional routers 2 are arranged such that two alternative routing paths from the monitoring station to the monitored device 5 are enabled, the first routing path running via routers 2.1, 2.2 and 2.4, and the other routing path via routers 2.1, 2.3 and 2.4. Four of the additional switches 6 are arranged such that they allow two alternative interconnecting paths within subnetwork 3.4, which is the subnetwork between routers 2.3 and 2.4. Packets might either take a path via switches 6.2, 6.3 and 6.6, or via switches 6.2, 6.4 and 6.6. It will be assumed that the actual path in both directions runs via routers 2.1, 2.3 and 2.4 at the routing layer, and via switches 6.2, 6.4 and 6.6 within subnetwork 3.4 at the switching layer. The fifth additional switch 6.5 and the end devices 8.1, 8.2 have been included to illustrate the treatment of a switch which is on no possible interconnecting path. Below, it will be assumed that switch 6.4 becomes unavailable. However, before such a fault occurs, tracing is carried out, which will now be explained in connection with FIG. 3.

FIG. 3 includes a routing-layer representation of the network 1 of FIG. 2, including the routers 2.1 to 2.4, the monitoring station 4 and the monitored device 5. The actual path taken by packets (via routers 2.1, 2.3 and 2.4) is indicated by arrows. Two embodiments of a tracing method, i.e. of how to find the actual path taken by the packets are illustrated in FIG. 3. The first illustrated embodiment is based on a record-route functionality. The monitoring station 4 sends one or more packets, with the record-route option enabled, to the monitored device 5, for example in the framework of a Ping request with record-route option. This causes all routers 2 which forward the packet to append their IP address to an option field of the packet. Consequently, as shown in FIG. 3, first router 2.1 appends its address to the packet, then router 2.3, and finally, router 2.4. The monitored device 5 then returns a response to the monitoring station 4 including this list of addresses which (since the address of router 2.2 is not included) represents the actual routing path from the monitoring station 4 to the monitored device 5.

The second embodiment of a tracing method illustrated in FIG. 3 is based on the use of different TTL parameters; it is for example implemented in the Traceroute program. The monitoring station 4 sends a series of packets with different TTL parameters to the monitored device 5. A first packet is, for example, sent with TTL=1. The first router 2.1 on the routing path does not forward the packet, but rather returns a "time exceeded" message containing its IP address to the monitoring station 4. The monitoring station 4 then sends a second packet, with the TTL=2. The first router 2.1 decrements the TTL parameter to 1 and forwards the packet to the next router 2.3. The router 2.3 does not forward the packet, but returns a "time exceeded" message containing its IP address. Then, the monitoring station 4 sends a third packet with TTL=3. Again, the TTL parameter is decremented by routers 2.1 and 2.3 and therefore not forwarded by the next router 2.4, which returns a "time exceeded" message containing its address. Finally, a fourth packet with TTL=4 reaches the monitored device 5 which thereupon confirms the receipt of the packet by returning a response to the monitoring station 4. Such an ordered series of "time exceeded" messages received at the monitoring station 4 is another representation of the actual path since it indicates the IP addresses of all the routers on the path in the correct order (again, it does not include router 2.2 which is not on the path).

Figure 4:
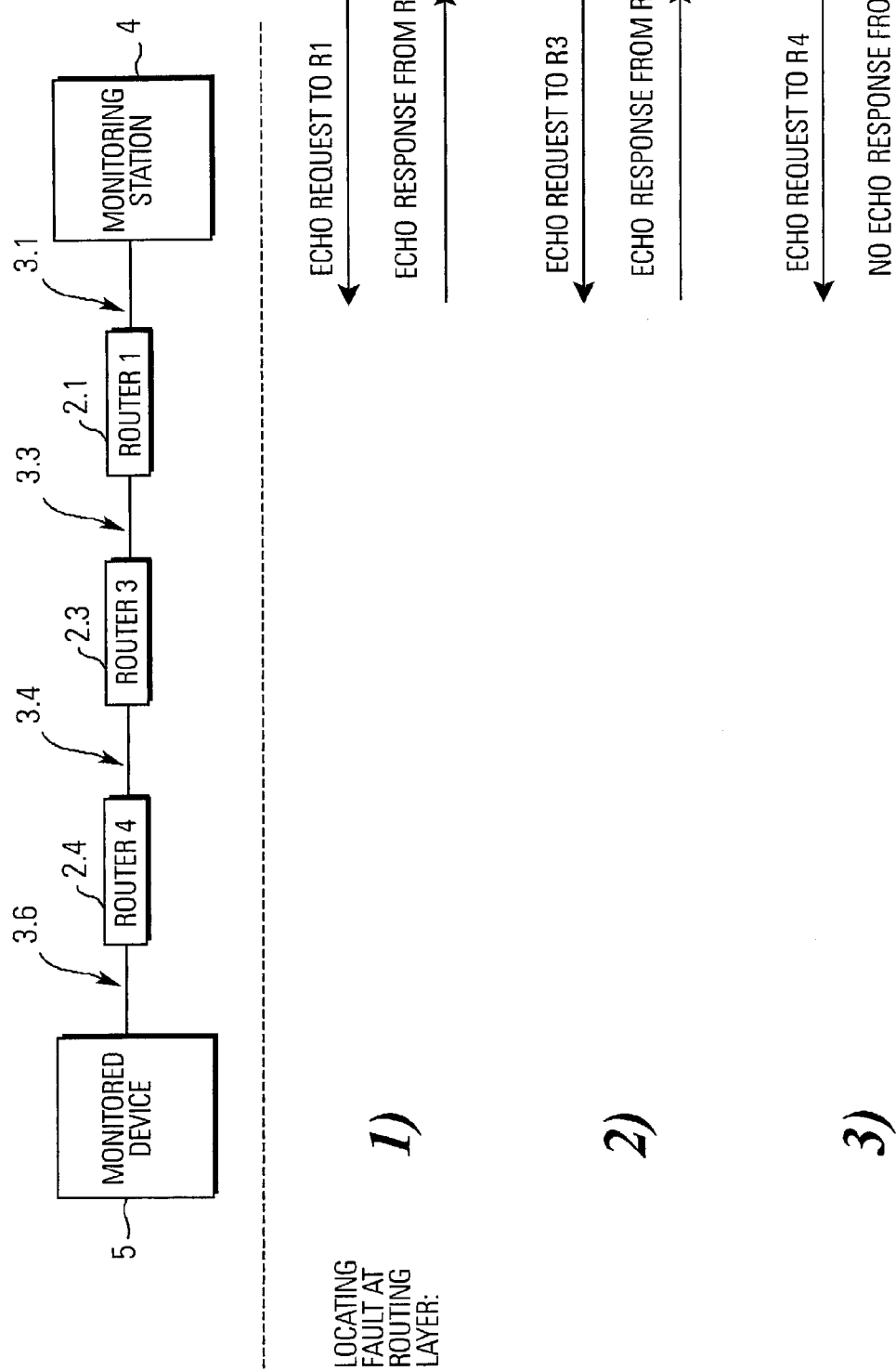
FIG. 4 illustrates an embodiment of fault diagnosis at the routing layer.

FIG. 4 includes a routing layer representation of the actual routing path of FIG. 2 (i.e. the router 2.2 is not present in FIG. 4). It is now assumed that a fault of the monitored device 5 is detected, for example by observing that the monitored device 5 no longer responds to echo requests (e.g. Ping requests) regularly sent to it from the monitoring station 4. Actually, the apparent fault of monitored device 5 is caused by switch 6.4 of FIG. 2. This (as well as the assumed fact that the actual interconnecting path runs over the faulty switch 6.4) is not (yet) known.

Upon detection of the apparent fault of monitored device 5, the fault diagnosis starts, which is also illustrated in FIG. 4: the monitoring station 4 first sends an echo request (e.g. a Ping request) to the first router 2.1 along the path, and receives a corresponding echo response (e.g. Ping response) from it. The monitoring station 4 then sends an echo request (e.g. a Ping request) to the next router 2.3 on the path, and receives a corresponding echo response (e.g. a Ping response) from it. The monitoring station 4 then sends an echo request (e.g. a Ping request) to the next router 2.4 on the path. However, since switch 6.4 lying on the interconnecting path between routers 2.3 and 2.4 is not available, it does not forward the echo request. Consequently, router 2.4 does not receive the request and returns no response to the monitoring station 4. The monitoring station 4 concludes from the absence of an echo response from router 2.4 that the fault is located in subnetwork 3.4, i.e. that a device or transmission line between routers 2.3 and 2.4 is faulty, or that the router 2.4 itself is faulty. Thus, as a result of the routing-layer fault diagnosis described so far, the root cause is located to within a subnetwork (which includes a router limiting this subnetwork). In embodiments in which this "granularity" is sufficient, the fault diagnosis method may be terminated at that point. In other embodiments, further steps are carried out in order to narrow down the fault to the switching layer.

Figure 5:
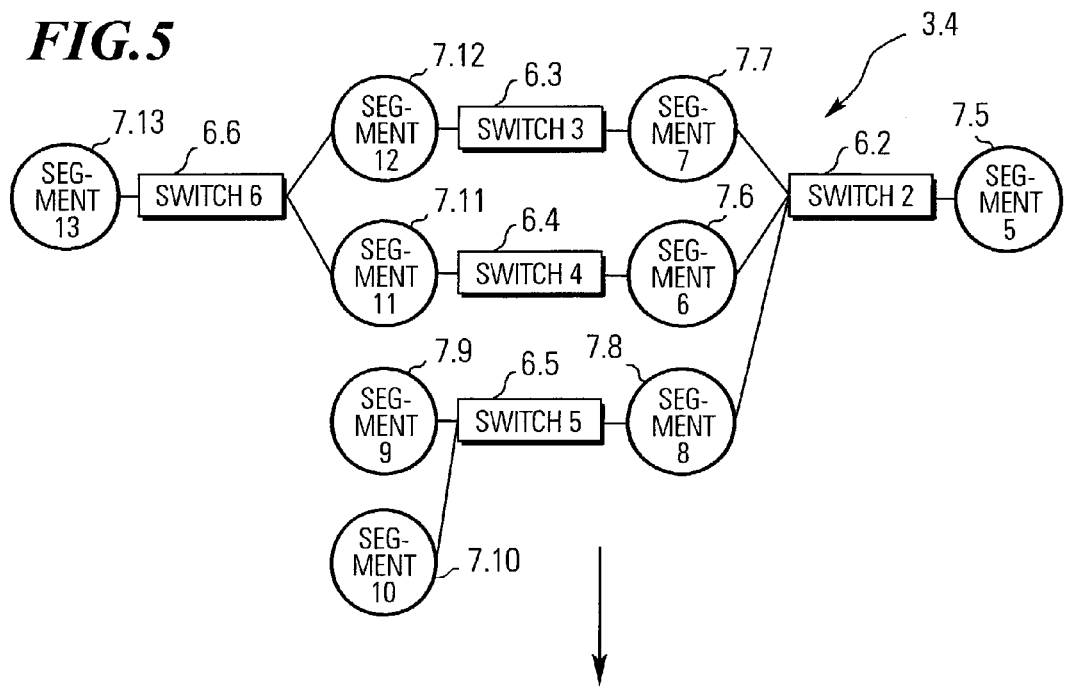
FIG. 5 is a modified switching-layer representation of a subnetwork of FIG. 2 in which a fault has been located.

FIG. 5 is a switching-layer representation of that subnetwork in which the fault has been located in the routing-layer fault diagnosis described in connection with FIG. 4, i.e. subnetwork 3.4. In the representation of FIG. 5, the segments 7 are not represented by lines, in contrast to the previous figures, but rather by circles. The fault diagnosis now proceeds to a search for all the interconnecting paths within the subnetwork 3.4 between the monitoring server 4 and the monitored device 5, which means here all the interconnecting paths between the start segment 7.5 and the destination segment 7.13.

Since the representation of FIG. 5 contains two types of "nodes", namely switches 6 and segments 7, this representation of the network topology is mapped in some embodiments to another representation which has only one type of node (namely segments) and therefore enables the known graph-search algorithms to be used nearly without modification.

Figure 6:
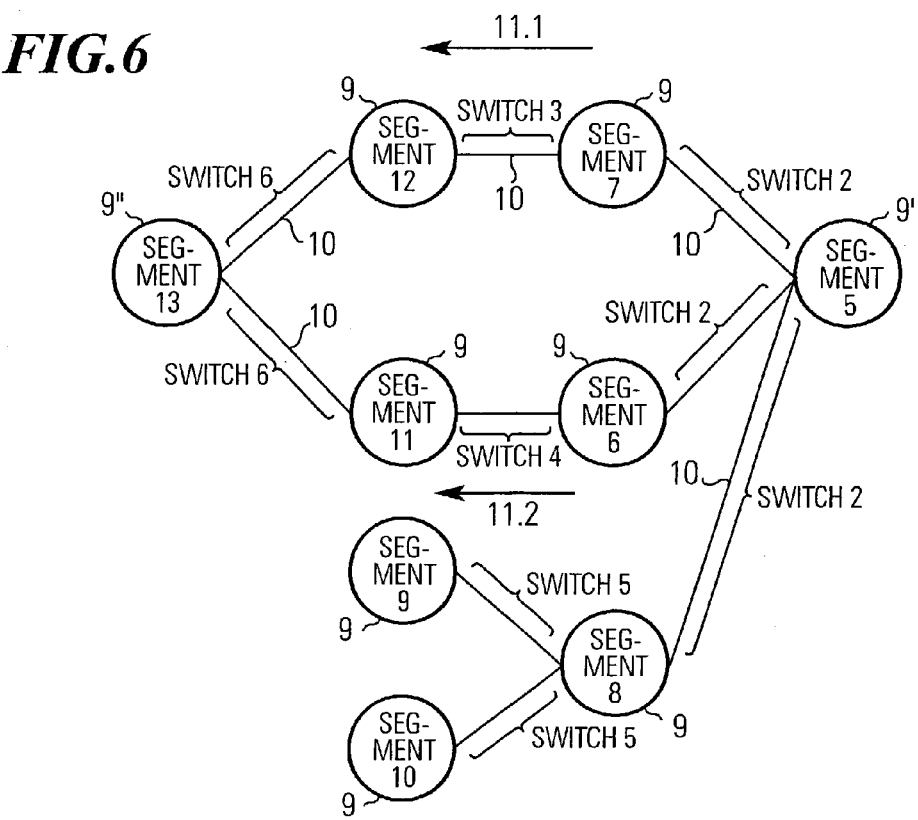
FIG. 6 is another representation of FIG. 5 on which a graph-search method is carried out.

This other representation is illustrated in FIG. 6. Segments 7 of the topology representation of FIG. 5 are mapped to nodes 9 and switches 6 are mapped to edges 10 of the graph representation of FIG. 6. A depth-first search or, in other embodiments, a breadth-first search is now carried out on the graph according to FIG. 6 so as to find all the possible paths from the start node 9' (i.e. "segment 5") to the destination node 9" (i.e. "segment 13") of the graph of FIG. 6. The graph search reveals that there are two interconnecting paths between the end and destination nodes 9', 9", i.e. a first interconnecting path 11.1 via segments 7 and 12 (i.e. via switches 2, 3 and 6), and a second interconnecting path 11.2 via segments 6 and 11 (i.e. via switches 2, 4 and 6). It is now clear that other switches and segments (switch 5 and segments 8, 9, 10) are on no interconnecting path between the start and destination nodes 9', 9", and therefore need not be considered in the further fault diagnosis. As an aside, in other embodiments, a searching step as the one illustrated in FIG. 6 may be carried out for several subnetworks 3 to be traversed by packets from the monitoring station 4 to the monitored device 5 before a fault is detected, which provides the possible interconnecting paths at the switching layer for the several subnetworks as a result. The result is stored. If a fault is later detected and located to a certain subnetwork by the methods described above, only that one (or those ones) of the stored interconnecting paths has to be selected which pertains to the subnetwork in which the fault has been located at the routing layer. In still other embodiments the monitoring station and the monitored device are within the same subnetwork; in those embodiments tracing or fault locating at the routing layer may be omitted, and the fault diagnosis may include only those steps relating to searching and fault locating at the switching layer.

FIG. 7 illustrates the operation of depth-first search and breadth-first search and the contrast between them. It shows in an exemplary larger graph the operation of depth-first search and breadth-first search after about one-third of the way through the process. In both cases, the search starts at the node at the bottom left. As indicated by FIG. 7, depth-first search "explores" the graph by looking for new nodes far away from the start node, taking closer nodes only when dead-ends are encountered. In contrast, breadth-first search completely covers the area closed to the starting point, moving farther away only when everything close has been looked at. Beyond these operational differences, both searches provide the same result, i.e. the paths between a start node and a destination node, apart from differences in the order in which paths are found.

Figure 8:
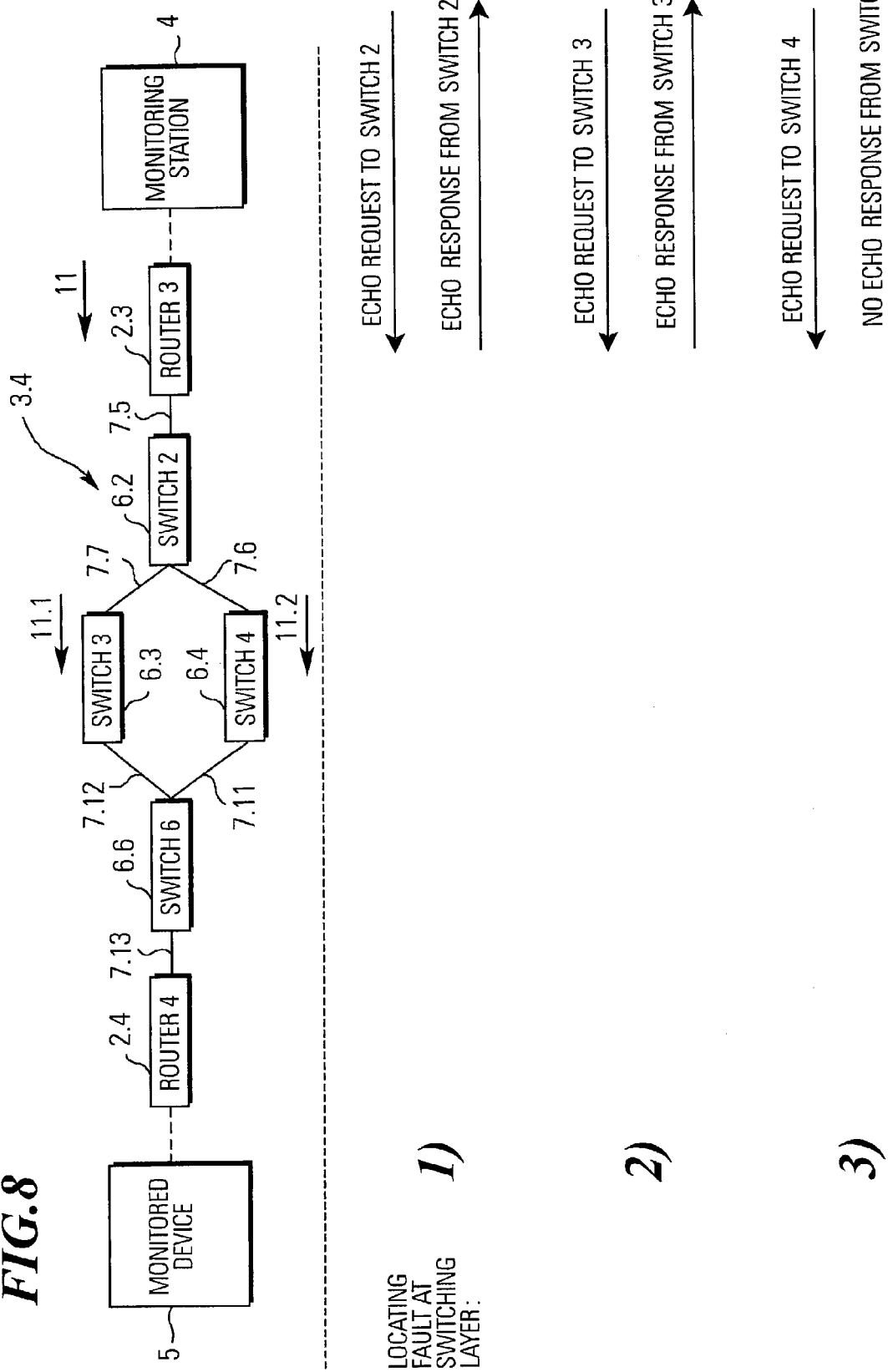
FIG. 8 illustrates an embodiment of fault diagnosis at the switching layer.

FIG. 8 is a switching layer representation of the possible interconnecting path 11.1 and 11.2 within subnetwork 3.4 in which the fault has been located. Switches on other paths (i.e. switch 6.5) have been dropped, compared with the complete switching-layer representation of FIG. 5. The fault diagnosis now proceeds at the switching layer, which is also illustrated in FIG. 8. The monitoring station 4 first sends an echo request (e.g. a Ping request) to the first switch 6.2 along the interconnecting path 11, and receives a corresponding echo response (e.g. Ping response) from it. The monitoring station 4 then sends an echo request (e.g. Ping request) to the next switch, 6.3 on one of the branches (here 11.1) of the path 11, and receives a corresponding echo response (e.g. a Ping response) from it. The monitoring station 4 then sends an echo request (e.g. a Ping request) to the next switch 6.4 on the other possible branch 11.2. However, since switch 6.4 is not available, it returns no echo response. (In other embodiments with "one-way traffic", in which the traffic in the direction from the monitoring station 4 to the monitored device 5 runs via switch 6.3, and only the traffic in the reverse direction, from monitored device 5 to monitoring station 4 runs via switch 6.4, the router 2.4 would receive the echo request and issue a response, but the response would not be forwarded by the unavailable switch 6.4 and, therefore, not reach the monitoring station 4). The monitoring station 4 concludes from the absence of an echo response from switch 6.4 that switch 6.4 itself is the faulty device or that segment 7.6 which connects switch 6.4 with the last available switch 6.2 on the interconnecting path 11.2 is interrupted. Thus, as a result of the fault diagnosis network, the root cause of the apparent fault of the monitored device 5 is narrowed down to a switch or a segment adjacent to it.

Figure 9:
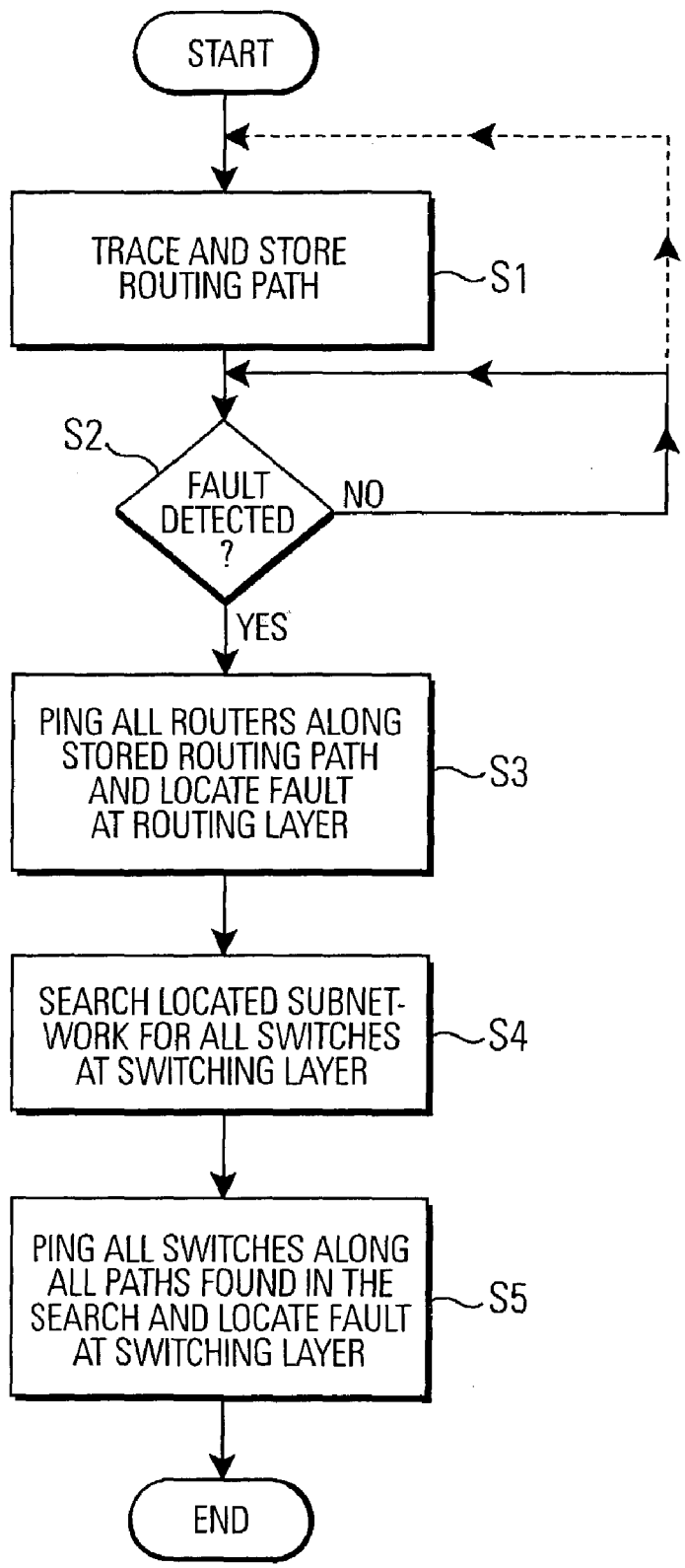
FIG. 9 is a high-level flow diagram of an embodiment of the fault diagnosis.

FIG. 9 is a high-level flow diagram of an embodiment of the fault diagnosis. In step S1 the routing path between the monitoring station and the monitored device is traced and stored. In step S2 it is ascertained whether an (apparent) fault of the monitored device has been detected. If the answer is negative, step S2 is repeated and, from time to time also the tracing and storing step S1 is repeated in order to keep the routing path information up to date. If the answer is positive, in step S3 all the routers along the stored routing path are pinged, and based on their Ping responses the fault is located at the routing layer. In step S4 a search is carried out within the located subnetwork (i.e. the subnetwork, in which the fault has been located in previous step S3) for all the switches at the switching layer. In step S5 all the switches along all the possible paths (found in the search in step S4) are pinged, and based on the switch reponses the fault is located at the switching layer.

In other embodiments, a searching step corresponding to step S4 is carried out before the detection of a fault in step. S2, and optionally also before the tracing step S1. In these embodiments, interconnecting paths are not only searched in a particular subnetwork, but in all subnetworks for which the interconnecting path information might be required in the event of a fault. In those embodiments, step S4 is then modified to a step of selecting, among the sets of possible interconnecting paths obtained and stored in a previous searching step for several subnetworks that set which is associated to the subnetwork in which the fault has been located in previous step S3.

Figure 10:
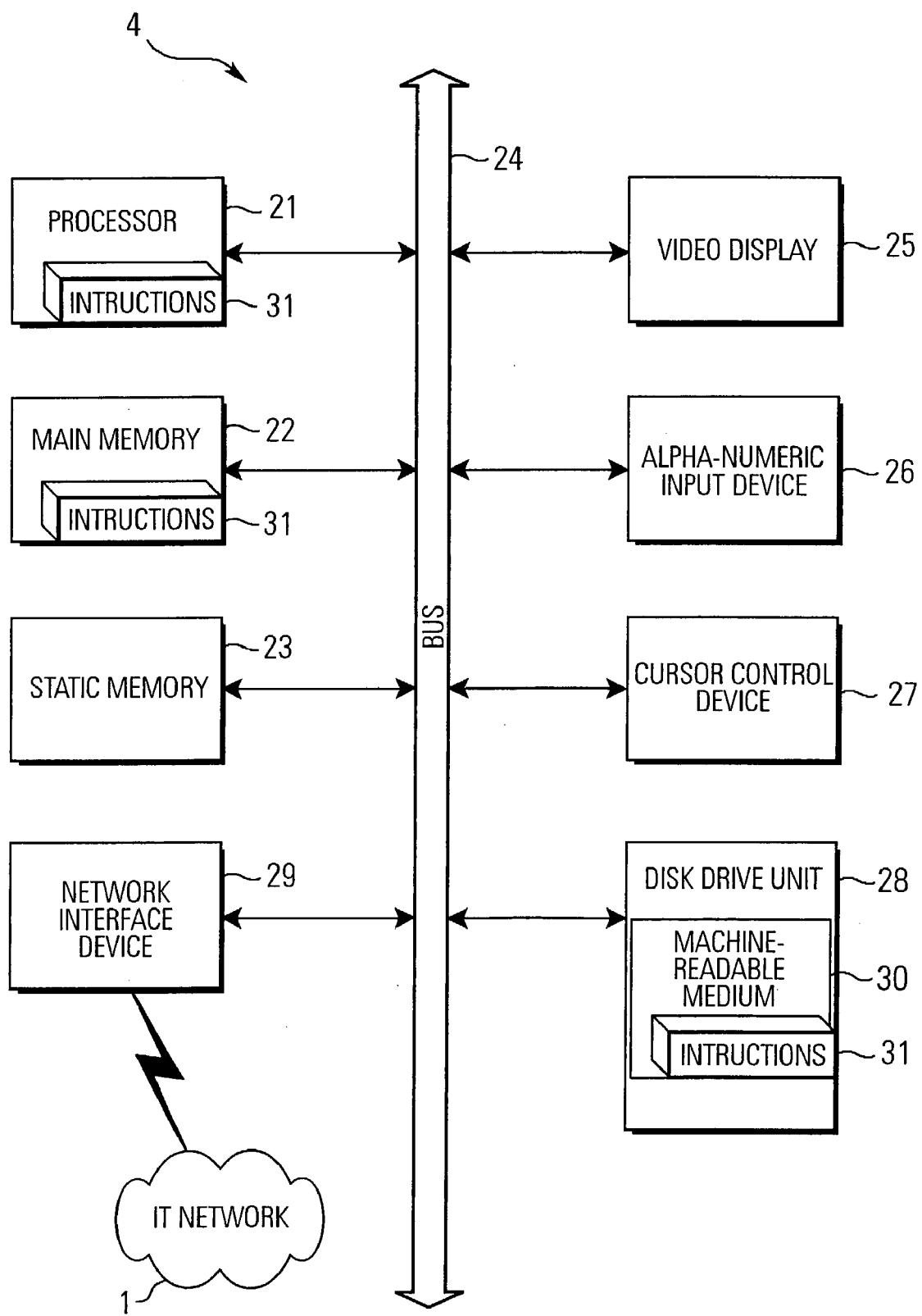
FIG. 10 shows a diagrammatic representation of a monitoring computer system within which a set of instructions, for causing the system to perform any of the methodologies discussed herein, may be executed.

FIG. 10 shows a diagrammatic representation of a monitoring station in the form of a computer system 4 within which a set of instructions, for causing the monitoring station to perform any of the methodologies discussed herein, may be executed. The computer system 4 includes a processor 21, a main memory 22 and a network interface device 29, which communicate with each other via a bus 24. It may further include a static memory 23, a video display unit 25, an alpha-numeric input device 26, a cursor control device 27, and a disk drive unit 28. The network interface device 29 connects the computer system to the IT network 1 (actually, the computer system 200 is part of the IT network 1). The communication between the monitoring computer system 4 with the monitored device 5 and interconnect devices 2, 6, as described above, goes through the network interface device 29.

The disk drive unit 208 includes a machine-readable medium 30 on which is stored a set of instructions (i.e. software) 31 embodying any one, or all, of the methodologies described above. The software 31 is also shown to reside, completely, or at least partially, within the main memory 22 and/or within the processor 21. The software 31 may further be transmitted or received via the Internet and the IT network 1 through the network interface device 29.

Thus, the described embodiments of fault diagnosis enable an apparent fault of a monitored device to be located.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A computer-implemented method of carrying out fault diagnosis of a monitored device in an IT network, said IT network having a topology, and a monitoring station, comprising:
    searching a data representation of the topology for at least one interconnecting path between the monitoring station and the monitored device within at least a subnetwork of the IT network;
    in response to an apparent fault of the monitored device, sending at least one request to a device or devices along the interconnecting path;
    locating the fault based on whether or what sort of a reply to the request is received from the requested device or devices,
    wherein the device or devices along the interconnecting path found in the searching step comprise devices at a switching layer.

2. The method of claim 1, wherein the step of searching is also carried out in response to an apparent fault of the monitored device.

3. The method of claim 1, wherein, in the step of searching, all interconnecting paths between the monitoring station and the monitored device within at least the subnetwork are searched.

4. The method of claim 1, wherein the step of searching comprises applying a graph search algorithm to the data representation of the topology of at least the subnetwork.

5. The method of claim 4, wherein the graph search is a depth-first search or a breadth-first search.

6. The method of claim 1, wherein the request sent to a device along the interconnecting path is an echo request, and the reply sent by a requested device is an echo reply.

7. The method of claim 1, wherein, if more than one device is found along the interconnecting path in the step of searching, requests are sequentially sent to devices beginning with the device nearest to the monitoring station.

8. The method of claim 1, wherein the fault is located in that device or a connection to that device which lies beyond the device furthest from the monitoring station along the interconnecting path that returns a reply or a reply indicating normal functioning.

9. A method of carrying out fault diagnosis in an IT network in response to an apparent fault of a monitored device, comprising the steps of:
    sending at least one request to a routing layer device or devices of the network along a stored routing path, to locate the fault at the routing layer to within at least one subnetwork;
    sending at least one request to a switching layer device or devices along an interconnecting path between the monitoring station and the monitored device within the at least one subnetwork; and
    locating the fault at the switching layer based on whether or what sort of a reply to the request is received from the requested switching layer device or devices.

10. A method according to claim 9 further comprising the step of tracing and storing the routing path between the monitoring station and the monitored device at the routing layer.

11. A method according to claim 9 wherein the fault at the routing layer is located to within the at least one subnetwork based on whether or what sort of a reply to the request is received from the requested routing layer device or devices.

12. A method according to claim 9 further comprising the step of searching, at the switching layer, a data representation of the topology of at least the at least one located subnetwork for the interconnecting path.

13. A computer-implemented method of carrying out fault diagnosis of a monitored device in an IT network, said IT network having a topology, a routing and a switching layer, at least one subnetwork, and a monitoring station, comprising:
    tracing and storing a routing path between the monitoring station and the monitored device at the routing layer;
    in response to an apparent fault of the monitored device, sending at least one request to a routing layer device or devices along the stored routing path;
    locating the fault at the routing layer to within one of the subnetworks based on whether or what sort of a reply to the request is received from the requested routing layer device or devices;
    searching, at the switching layer, a data representation of the topology of at least the located subnetwork for at least one interconnecting path between the monitoring station and the monitored device within at least the located subnetwork;

sending at least one request to a switching layer device or devices along the interconnecting path;

locating the fault at the switching layer based on whether or what sort of a reply to the request is received from the requested switching layer device or devices.

14. The method of claim 13, wherein the step of tracing comprises sending a packet with a record-route functionality from the monitoring station to the monitored device or vice versa, which causes the routers along the routing path to identify themselves.

15. The method of claim 14, wherein the step of tracing comprises using the Ping program.

16. The method of claim 13, wherein the step of tracing comprises sending a series of packets with a varying time-to-leave or hop-count parameter which causes routers along the routing path in which the time-to-live or number of hops is exceeded to return a message including an identification of the respective router, thereby enabling identification of the routers along the routing path.

17. The method of claim 13, wherein the step of tracing comprises using the Traceroute program.

18. The method of claim 13, wherein the request sent to a routing layer or switching layer device along the stored routing path or the interconnecting path is an echo request, and the reply sent by a requested device is an echo reply.

19. The method of claim 13, wherein, if more than one routing layer device has been found along the routing path in the tracing step, requests are sequentially sent to routing layer devices beginning with the routing layer device nearest to the monitoring station.

20. The method of claim 13, wherein the fault is located to be in that subnetwork which lies beyond the routing layer device furthest from the monitoring station along the routing path that returns a reply or a reply indicating normal functioning.

21. The method of claim 13, wherein in the step of searching all interconnecting paths between the monitoring station and the monitored device within at least the subnetwork are searched.

22. The method of claim 13, wherein the step of searching comprises applying a graph search algorithm to the to the data representation of the topology.

23. The method of claim 22, wherein the graph search algorithm is a depth-first search or a breadth-first search.

24. The method of claim 13, wherein, if more than one switching layer device is found along the interconnecting path in the step of searching, requests are sequentially sent to switching layer devices beginning with the switching layer device nearest to the monitoring station.

25. The method of claim 13, wherein the fault is located to be in that switching layer or routing layer device or a connection to that device which lies beyond the device furthest from the monitoring station along the interconnecting and routing path that returns a reply or a reply indicating normal functioning.

26. A computer-implemented method of carrying out fault diagnosis of a monitored device in an IT network, said IT network having a topology, a routing and a switching layer, at least one subnetwork, and a monitoring station, comprising:

tracing and storing a routing path between the monitoring station and the monitored device at the routing layer;

searching, at the switching layer, a data representation of the topology for at least one interconnecting path between the monitoring station and the monitored device;

in response to an apparent fault of the monitored device, sending at least one request to a routing layer device or devices along the stored routing path;

locating the fault at the routing layer to within one of the subnetworks based on whether or what sort of a reply to the request is received from the requested routing layer device or devices;

sending at least one request to a switching layer device or devices along the interconnecting path within the located subnetwork;

locating the fault at the switching layer based on whether or what sort of a reply to the request is received from the requested switching layer device or devices.

27. A computer program product containing computer readable medium encoded with instructions for performing, when executed on a monitoring computer system, fault diagnosis in an IT network in response to an apparent fault of a monitored device;

the program code is arranged to send at least one request to a routing layer device or devices of the network along a stored routing path, to locate the fault at the routing layer to within at least one subnetwork;

the program code is arranged to send at least one request to a switching layer device or devices along an interconnecting path between the monitoring station and the monitored device within the at least one subnetwork; and the program code is arranged to locate the fault at the switching layer based on whether or what sort of a reply to the request is received from the requested switching layer device or devices.

28. A computer program product containing computer readable medium encoded with instructions for performing, when executed on a monitoring computer system, fault diagnosis of a monitored device in an IT network having a topology, a routing and a switching layer, and at least one subnetwork;

said program code enables, when executed, a routing path between the monitoring computer system and the monitored device at the routing layer to be traced and stored;

the program code is arranged to send, in response to an apparent fault of the monitored device, at least one request to a routing layer device or devices along the stored routing path;

the program code is arranged to locate the fault at the routing layer to within one of the subnetworks based on whether or what sort of a reply to the request is received from .the requested routing layer device or devices;

the program code enables a data representation of the topology of at least the located subnetwork to be searched, at the switching layer, for at least one interconnecting path between the monitoring computer system and the monitored device within at least the located subnetwork;

the program code is arranged to send at least one request to a switching layer device or devices along the interconnecting path;

the program code is arranged to locate the fault at the switching layer based on whether or what sort of a reply to the request is received from the requested switching layer device or devices.

29. A computer program product containing computer readable medium encoded with instructions for performing, when executed on a monitoring computer system, fault diagnosis of a monitored device in an IT network having a topology, a routing and a switching layer, and at least one subnetwork;

said program code enables, when executed, a muting path between the monitoring computer system and the monitored device at the routing layer to be traced and stored;

the program code enables a data representation of the topology to be searched, at the switching layer, for at least one interconnecting path between the monitoring computer system and the monitored device;

the program code is arranged to send, in response to an apparent fault of the monitored device, at least one request to a routing layer device or devices along the stored routing path;

the program code is arranged to locate the fault at the routing layer to within one of the subnetworks based on whether or what sort of a reply to the request is received from the requested routing layer device or devices;

the program code is arranged to send at least one request to a switching layer device or devices along the interconnecting path within the located subnetwork;

the program code is arranged to locate the fault at the switching layer based on whether or what sort of a reply to the request is received from the requested switching layer device or devices.

* * * * *